(12) United States Patent
Alguera Gallego et al.

(10) Patent No.: US 6,623,024 B1
(45) Date of Patent: Sep. 23, 2003

(54) FIFTH WHEEL COUPLING

(75) Inventors: José Manuel Alguera Gallego, Aschaffenburg (DE); Stefan Koetter, Mörfelden-Walldorf (DE); Rainer Spitz, Eltville (DE)

(73) Assignee: Jost-Werke AG, Frankfurt am Main (DE)

(*) Notice: Subject to any disclaimer, the term of this patent is extended or adjusted under 35 U.S.C. 154(b) by 0 days.

(21) Appl. No.: 09/646,637

(22) PCT Filed: Mar. 24, 1999

(86) PCT No.: PCT/EP99/02014

§ 371 (c)(1),
(2), (4) Date: Sep. 20, 2000

(87) PCT Pub. No.: WO99/50129

PCT Pub. Date: Oct. 7, 1999

(30) Foreign Application Priority Data

Mar. 27, 1998 (DE) .......................... 198 13 635

(51) Int. Cl.⁷ .............................. G62D 53/08
(52) U.S. Cl. ........................ 280/433; 384/421
(58) Field of Search .................. 280/433, 437, 280/438.1, 441, 441.1; 384/594, 421, 422

(56) References Cited

U.S. PATENT DOCUMENTS

| 2,530,311 A | | 11/1950 | Nabors | |
|---|---|---|---|---|
| 2,662,799 A | * | 12/1953 | Schaefer | 308/136 |
| 2,670,220 A | * | 2/1954 | Colpo | 280/438 |
| 3,924,909 A | * | 12/1975 | Kent et al. | 308/136 |
| 5,165,714 A | * | 11/1992 | Kaim | 280/433 |
| 5,263,856 A | * | 11/1993 | Huehn et al. | 384/421 |
| 5,431,424 A | * | 7/1995 | Colwell | 280/433 |
| 5,482,308 A | * | 1/1996 | Marcu | 280/433 |
| 5,511,812 A | * | 4/1996 | Milner | 280/433 |
| 5,746,438 A | * | 5/1998 | Bergmann et al. | 280/433 |

FOREIGN PATENT DOCUMENTS

| DE | 35 30 467 | 3/1987 | | |
|---|---|---|---|---|
| DE | 44 18 533 | 11/1995 | | |
| DE | 296 03 641 | 8/1996 | | |
| EP | 0 117 319 | 9/1984 | | |
| EP | 0139766 | * 11/1988 | | 280/433 |
| EP | 0512862 A1 | * 5/1992 | | 280/433 |
| EP | 0 562 887 | 9/1993 | | |

* cited by examiner

Primary Examiner—Lesley D. Morris
Assistant Examiner—Tony Winner
(74) Attorney, Agent, or Firm—Hudak, Shunk & Farine Co. LPA (57) ABSTRACT

Fifth wheel couplings are used to form an articulated connection between a fifth wheel tractor and a semitrailer. They usually have a fifth wheel coupling plate which is fixed on the fifth wheel tractor by bearing elements (5, 10) and which has a V-shaped recess (2) with a central cavity (3) and a lock for receiving and locking in a kingpin which is mounted on the semitrailer in the middle of an upper plate in such a way that it is fixed. The fifth wheel coupling plate also has an anti-attrition sliding layer (4a, b) on the side facing the upper plate. The inventive fifth wheel coupling plate consists of two separate components which can be mechanically interconnected, i.e. an upper bearing component (12a) which interacts with the upper plate and which is provided with the sliding layer (4a, b), and a lower supporting component (1b) on which the central recess (3) is provided with the engaging lock.

24 Claims, 7 Drawing Sheets

FIFTH WHEEL COUPLING

FIELD OF THE INVENTION

The invention concerns a fifth wheel coupling for the articulated connection of a tractor to a semitrailer, with a fifth wheel coupling plate secured by bearing elements on the tractor, having a cutout with a central recess and a lock for accommodation of a kingpin permanently mounted on the semitrailer at the center of an upper plate, and which has a friction-reducing sliding layer.

BACKGROUND OF THE INVENTION

Fifth wheel couplings are used for form-fitting, yet articulated connection of a tractor to a semitrailer, which then together form a so-called double train. The fifth wheel coupling has a fifth wheel plate with a typically V-shaped or mouthlike insertion cutout, also known as the coupling or capture mouth, which is bounded on both sides by a somewhat downward sloping horn. The V-shaped notch is typical, but not necessary. There can also be a coupling from above in the cutout. The insert cutout, the coupling mouth, passes into a central recess, in which a wearing ring is typically but not necessarily placed. On either side of the wearing ring, if present, there are lock elements, especially a locking hook, which are disengaged from the central recess when the fifth wheel coupling is open. The coupling plate can swivel and is joined to the frame of the tractor primarily by means of bearing blocks and possibly a mounting plate.

On the semitrailer, at the bottom of the front end, there is an upper plate on which is arranged a downwardly pointing coupling or kingpin. In the coupling process, this pin is guided by the coupling mouth in the coupling plate and inserted into its central recess until it comes to lie against the wearing ring. The upper plate forms, as it were, the counterplate to the coupling plate. As soon as the kingpin lies against the wearing ring, the lock elements are brought into the locking position, whereupon the locking hook embraces the kingpin with form fit, yet able to rotate.

Fifth wheel couplings of the above kind are generally known and are largely standard equipment on double trains (DIN74080=ISO 337).

Fifth wheel couplings of the above kind must satisfy several requirements. The weight of the semitrailer, the supporting or surface load, as well as all tensile and compressive forces occurring during turns and uphill travel, which are introduced via the kingpin, must be transmitted to the frame of the tractor. Coupling plates which according to the state of art were heretofore exclusively single-piece design (for example, see DE 296 03 641 U1) therefore have to be massively constructed in order to absorb the aforesaid forces. As a consequence, a relatively large amount of material is required for the production of the coupling plate and this is therefore correspondingly heavy.

Another fundamental problem with such couplings is the friction between the coupling plate and the upper plate on the semitrailer, especially because of the constant relative motions between them while traveling on curves.

In order to deal with this problem, it is known (DE 35 30 467 A1; EP 0 117 319 B1; DE 44 18 533 C2) how to provide a coating or fastening of antifriction materials on the coupling plate. Usually these antifriction materials have the form of arc-shaped sliding coatings which preferably consist of plastic and which are embedded in corresponding recesses in the metallic coupling plate and secured there, for example, by gluing or preferably by screwing, so that the sliding layer projects somewhat above the metallic coupling plate. The sliding layer can be bent like a horseshoe or have two approximately semicircular sliding layers, as in the case of the aforesaid DE 296 03 641 U1, which are screwed together with the coupling plate.

SUMMARY OF THE INVENTION

The basic goal of the invention is to configure the above-mentioned fifth wheel coupling such that, while reducing the material outlay, its weight is considerably decreased and a modular construction is possible.

The solution of this problem, according to the invention, is that the coupling plate consists of two mechanically connectable, separate structural components, with an upper bearing component, which interacts with the upper plate, and with a lower carrying component, in which the central cavity with the lock is placed.

The lower beamlike carrying component is basically assigned the function of transmitting the force from the kingpin to the bearing and, thus, to the frame of the tractor. It accommodates the locking mechanism with the wearing ring, if present.

In the fifth wheel coupling according to the invention, therefore, only the lower beamlike carrying component absorbs the support load and the large forces introduced by the kingpin, namely, the tensile forces when traveling on level and rising terrain, the compressive forces on falling terrain, as well as the transverse and lift forces when traveling on curves, so that only this carrying component needs to be mechanically stable in configuration, and a considerable savings in material can be achieved thanks to the beamlike construction. The upper plate-like bearing component need only be designed for the surface load of the semitrailer, also known as the vertical load, since its only task is to bundle the forces originating in the upper plate of the semitrailer and to transfer them to the carrying component, and therefore certain degrees of freedom in design result in terms of the shape of this component and the materials used for its production.

Another task of the bearing component is to provide low frictional moments when traveling on curves.

Since the upper bearing component is exposed to the greatest wear, besides the friction in the wearing ring (if present), now that it is free from the function of absorbing the considerable forces produced by the kingpin it can be designed, in particular by choice of appropriate materials, specifically for the requirements of:

low maintenance corrosion protection low weight.

The breaking up of the functions of a fifth wheel coupling between the two components also enables a modular design with great benefit.

One can keep in stock lower beam carrying components designed for different load uptake in the manner of a prefabricated unit and combine them in easy and economical fashion with upper bearing components of various design.

According to a first embodiment of the invention, the bearing component is screwed together with the carrying component. This embodiment allows a simple construction.

Several structural options are available to the practitioner for the connection of the two components. Preferably, because it allows a good and easy to produce fastening, the connection of the two components is by means of screws.

For this, according to another embodiment of the invention, a circular ring-shaped molding with several fastening holes is provided on the lower beamlike carrying component, and a congruent crown of fastening holes is provided on the upper bearing component to receive fastening screws.

By separating the functions, one obtains degrees of freedom in the configuration of the upper bearing component. Thus, according to one embodiment of the invention, it is possible to make them out of metal, preferably steel, or aluminum or cast iron. Connection elements can be provided on it for a preferably form-fitting connection to sliding linings forming a sliding layer.

One alternative to this is to coat the entire upper bearing component with a sliding layer, consisting preferably of a plastic which has good sliding properties, like teflon, and which forms a corrosion protection for the steel plate.

According to another embodiment of the invention, the upper bearing component can consist entirely of plastic. The plastic is preferably a fiberglass-reinforced plastic and/or has a reinforcement in the form of embedded pieces. It can also be a multilayered body, with a lower carrying layer and an upper sliding layer.

There are also several possible configurations for the horns bordering the typically V-shaped notch. Thus, these horns can be formed either on the upper bearing component, which then has a conventional shape, or the horns are placed on the lower carrying component, in which case the upper bearing component can then have the simple shape of a circular ring with a V-cutout. The horns can be molded as a single piece with the corresponding component; however, to foster a modular design, it is advisable for each horn to be a separate piece, which can be detachably connected to the corresponding component. Therefore, when wear occurs, only the corresponding horn and not the entire component need be replaced.

There are also several options available to the practitioner for the configuration of the lower beamlike carrying component. According to a further embodiment of the invention, this carrying component consists of three beams, a main middle beam as well as secondary side beams each parallel with it, which are joined together at both ends to form the base for the bearing element at the coupling side. According to a further embodiment of the invention, the bearing element can be molded as a single piece with the base; however, it is preferable for the bearing element to be a separate component, which can be detachably connected to the base. This technique also supports the benefits of the modular design.

There are also several options for the practitioner in mounting the lower carrying component on the double train. According to a preferred embodiment, the bearing element is a journal, and the corresponding split bearing is formed immediately in the frame of the double train, and a clamplike component embracing the journal at the top and secured to the frame is provided to attach the journal.

Additional benefits, especially as regards the design of the components and a modular construction, will result if, according to a further embodiment of the invention, the bearing component consists of two separate platelike parts, known as wing plates, which are arranged on either side of a platelike middle piece provided at the center of the carrying component, which has the V-cutout with horns bounding it, preferably detachable.

There are various design solutions for the mounting of such a divided coupling plate in the bearing elements 5 on the double train. A first solution consists in that the two wing plates are secured on the beamlike carrying component, preferably being screwed to it, and the carrying component is accommodated in the bearing elements on the double train.

As compared to the above-described notion with an undivided bearing component, the advantage is that the forces act closer to the beam end of the carrying component, i.e., it is not exposed so heavily to bending stress.

A second solution is that the carrying component has two carrying beams, on which the two wing plates are held and can move, each of them being accommodated in one of the bearing elements on the double train.

In this solution, the wing plates advantageously divert the support load directly into the bearing sites, i.e., the forces are diverted directly into the frame of the double train. Moreover, thanks to the movability of the wing plates, different frame widths can be covered with the same component.

A third solution consists in that the beamlike carrying component has a journal at each of the beam ends, which is accommodated in one of the bearing elements on the double train and secured to a wing plate.

In this solution as well, the wing plates directly conduct the vertical load into the bearing sites, i.e., the frame.

Further configurations and advantages of the invention will result by means of the description of the sample embodiments of the invention as depicted in the drawings.

DETAILED DESCRIPTION OF THE INVENTION

Figure 8:
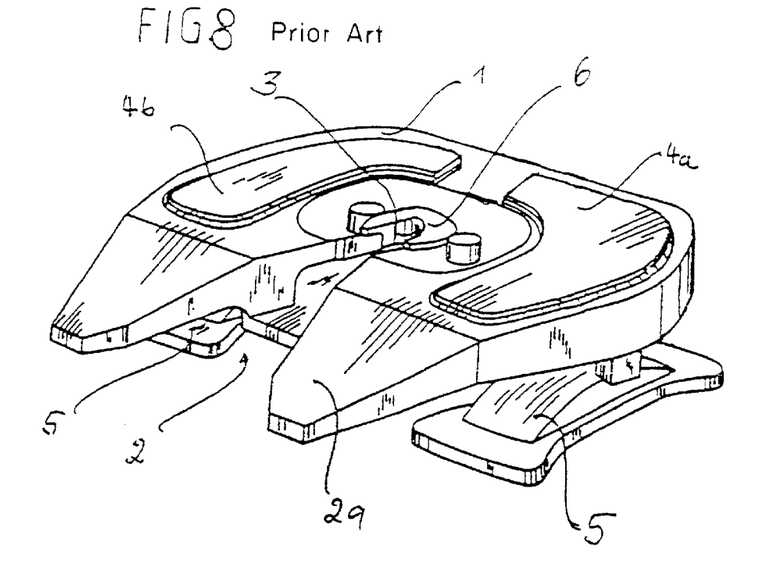
Figure 9:
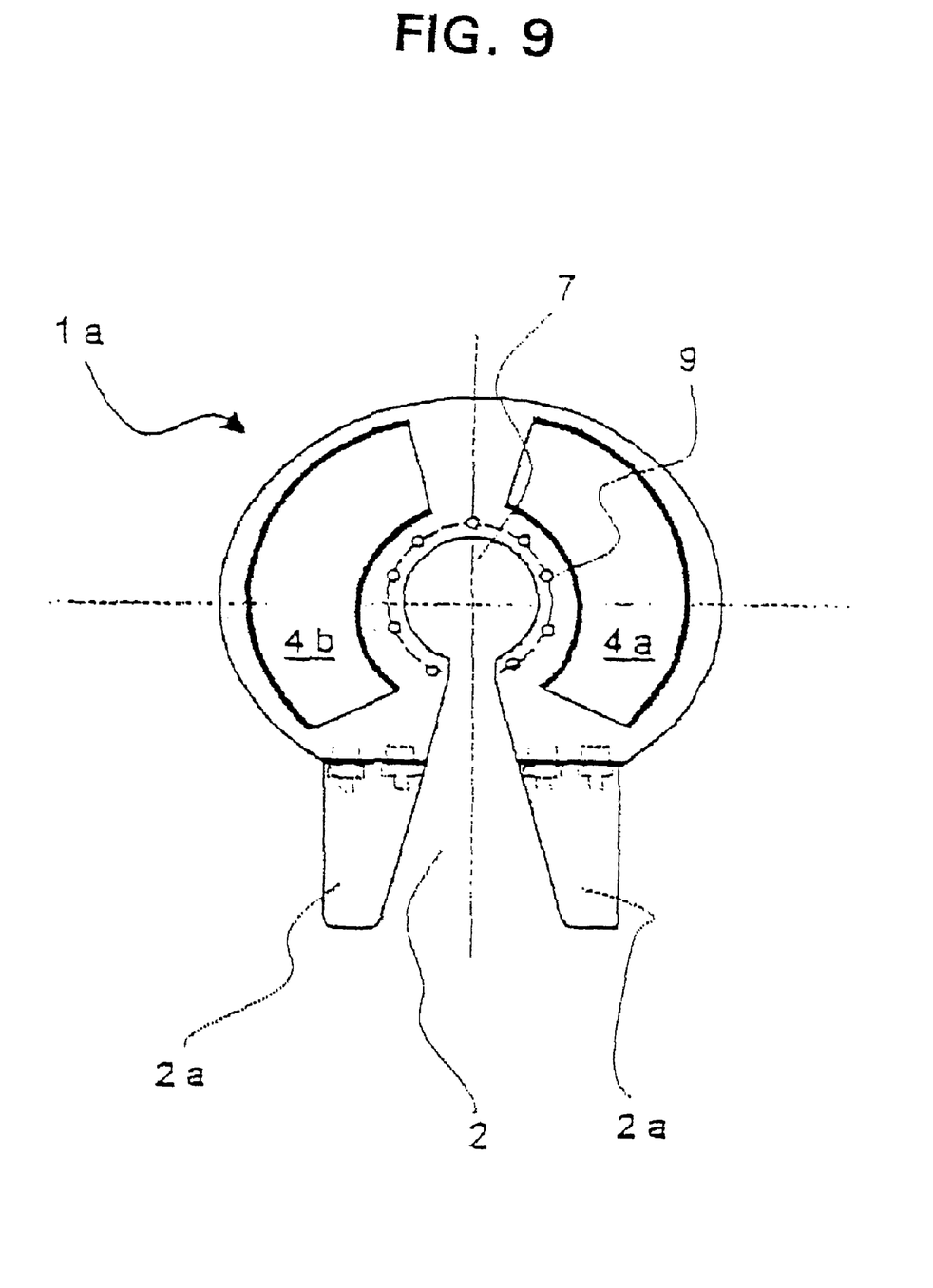
FIG. 9 is a top view of a fifth wheel coupling of the invention with each being a separate component, detachably connected to the upper bearing component.
Figure 10:
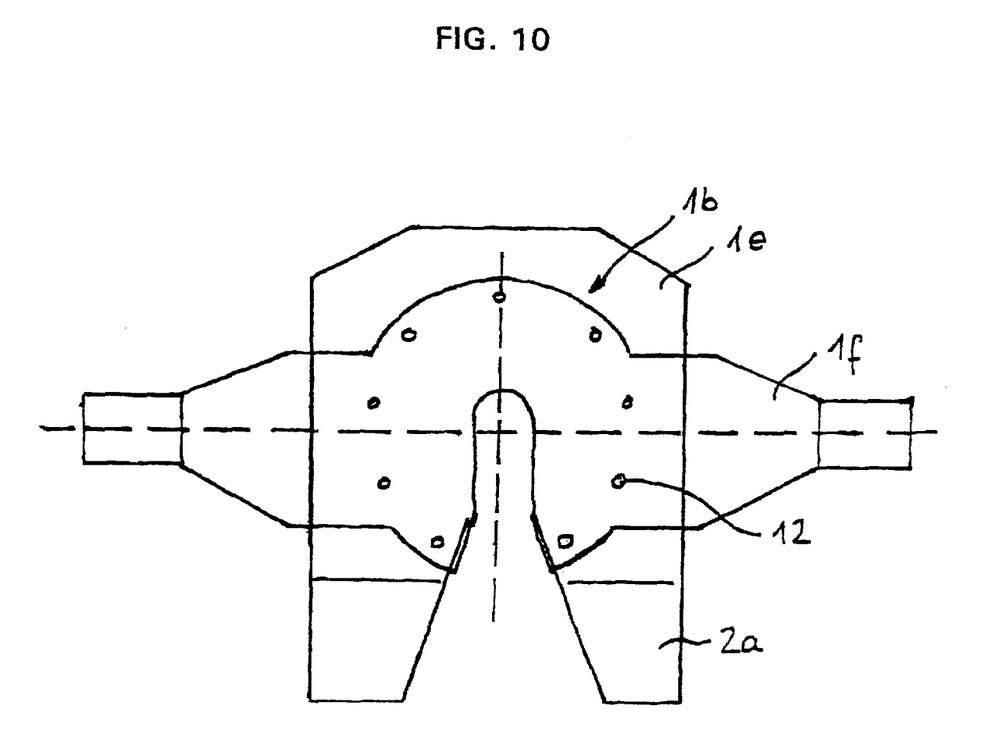
FIG. 10 is a top view of a lower carrying component with each horn being a separate component, which is detachably screwed to the lower carrying component.

FIG. 8 shows a conventional fifth wheel coupling for the articulated connection of a tractor to a semitrailer. It consists of a coupling plate 1, which has a coupling mouth 2 with a central recess 3 and a wearing ring 6 concentric to this for receiving and securing by means of a lock a kingpin firmly arranged on the semitrailer at the center of an upper plate. To enhance the sliding capability, two sliding linings 4a, b are arranged on the top of the coupling plate 1, preferably by being screwed to the coupling plate. The coupling plate is connected by bearing bolts to bearing blocks 5, which in turn are firmly and immovably joined to the frame of the double train, either directly or indirectly by means of a mounting plate.

The above coupling plate according to the state of the art consists of a single component. But since considerable tensile and compressive forces have to be conducted via the kingpin onto the coupling plate and from there onto the frame of the double train, the coupling plate is accordingly massively configured, i.e., it has a correspondingly heavy weight and requires a correspondingly large amount of material for its fabrication.

Figure 1:
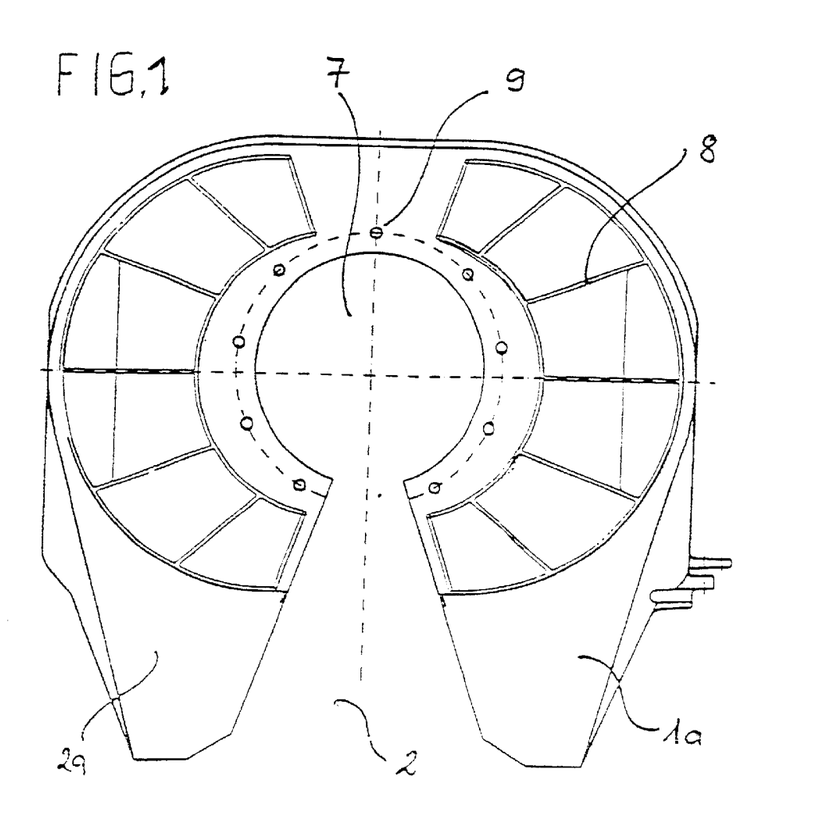
FIG. 1, in top view, a sample embodiment for the configuration of the upper bearing component with a two-piece coupling plate according to the invention, FIG. 2, in two side views A, C and one top view B, a sample embodiment for the lower beamlike carrying component with a two-piece coupling plate according to the invention, FIG. 3, a variant for an interchangeable mounting of the joint pin on the lower beamlike carrying component, FIG. 4, a sample embodiment for mounting the lower carrying component, FIGS. 5 and 6, in various sectional views, another embodiment of the invention's divided coupling plate with a two-piece upper bearing component, FIG. 7, a variant for mounting the divided coupling plate per FIGS. 5 and 6, and FIG. 8, in a perspective drawing, a conventional fifth wheel coupling with a single-piece coupling plate.
Figure 2:
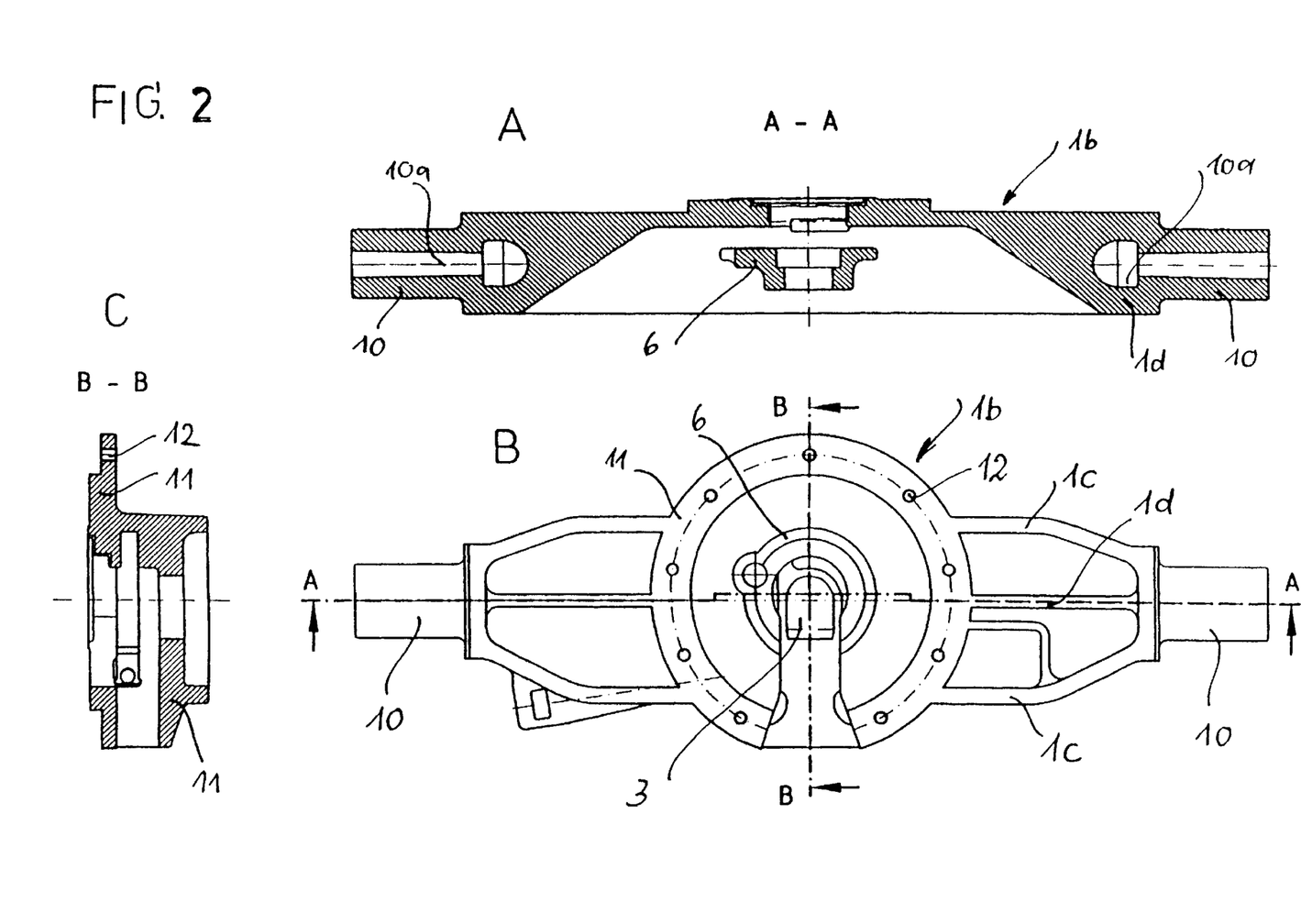

These problems are avoided by the invention's divided coupling plate, one embodiment of which is depicted in FIGS. 1 and 2.

This embodiment of the invention's coupling plate calls for two mechanically connectable, separate components, an upper platelike bearing component 1a per FIG. 1, which interacts with the upper plate of the semitrailer, and a lower beamlike carrying component 1b per FIG. 2, which can swivel and be connected to the frame of the double train via bearing elements, here in the form of journals 10.

The upper bearing component 1a in the sample embodiment of FIG. 1, where the sliding linings have been removed from the coupling plate, has the V-shaped coupling mouth 2 and a central opening 7 concentric to the recess 3 (see FIG. 8 or 2) for a nonfrictional transition of the kingpin, so that no forces are conducted from the kingpin onto the upper bearing component. This upper bearing component 1a therefore only needs to be designed for the surface load of the semitrailer, since its only task is to bundle the forces originating in the bearing surface and transmit them onto the carrying component 1b. Another task of the bearing component 1a is to provide low frictional forces when traveling on curves.

For this, the bearing component 1a per FIG. 1 has several radially extending grooves 8 for a form-fitting connection with complementary configured lands arranged per FIG. 8 on the underside of the sliding linings 4a, 4b, depicted in FIG. 1.

Moreover, the upper bearing component 1a has a crown of fastening holes 9 for fastening to the lower carrying component 1b, depicted in FIG. 2. This component is shown in three views in FIG. 2, namely, a top view B, a sectional view A along line A—A in view B, and another sectional view C, taken along line B—B in the top view B. The lower carrying component 1b is beamlike with one auxiliary beam 1c on either side of a central beam 1d, with two journals 10 at the beam ends for fastening to the frame of the double train. These journals have cavities 10a to save weight.

Concentric and flush with the crown of fastening holes 9 per FIG. 1, the beamlike carrying component 1b has a circular ring molding 11 with fastening holes 12 for a screw connection.

On the lower beamlike carrying component 1b, furthermore, is the central recess 3 with the wearing ring 6, against which the kingpin lies. The carrying component 1b furthermore has recesses for the lock parts securing the kingpin, which need not be further explained here.

Since the tensile and compressive forces produced during operation by the kingpin are only conducted into the lower carrying component 1b and from there into the frame of the double train, this beamlike carrying component 1b is fashioned with appropriate stability, and a considerable material savings with simultaneous mechanical strength can be achieved by the beam configuration as compared to a plate-like component.

The bearing element, in the form of the journal 10 in the depicted sample embodiments, can be joined as a single piece with the lower beamlike carrying component 1b. However, according to FIG. 3, the journal is advantageously configured as an independent add-on piece, which can be mechanically connected to and loosened from the lower carrying component 1b in the usual manner. This also enables a modular design in respect of the bearing, here, a swivel bearing, in which lower beamlike carrying components of different configuration can be combined with different journals. This enables—starting from basic types—a flexible adaptation of the fifth wheel to different load requirements and different structural heights or frame width/superstructures on the double train. For example, in order to achieve a larger structural height, a cropped bearing element will be used.

Figure 4:
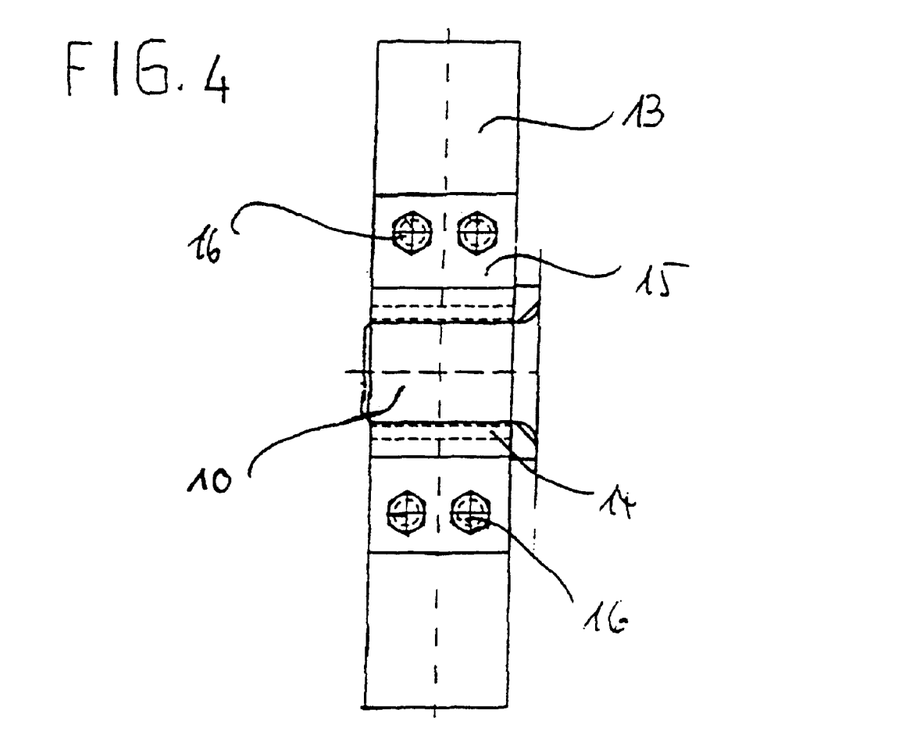

FIG. 4 shows a configuration for the mounting of the swivel journal 10 of the lower beamlike carrying component 1b directly in the frame 13 of a double train in a corresponding bearing clamp 14, and a clamp-like component 15 that is secured by screws 16 to the frame 13 holds the journal 10 in position in the split bearing.

Modifications are possible within the scope of the invention that depart from the depicted sample embodiments.

Thus, the sliding linings 4a, b, instead of being joined to the metallic surface of the coupling plate 1a with a form-fitting connection, can be so joined with a screw connection or a glue connection. It is also conceivable to coat a metallic upper bearing component 1a entirely with a layer of plastic to improve the sliding properties and to protect against corrosion. As an alternative, it is also conceivable to make the upper bearing component entirely from plastic, preferably a fiberglass-reinforced plastic, or in conjunction with embedded reinforcements. If necessary, a layer improving the sliding capability can also be deposited on the plastic piece.

The configuration of the upper bearing component 1a, as depicted in FIG. 1, preferably has the conventional shape of a coupling plate.

However, it is also conceivable to provide the horns 2a of the coupling mouth 2, the insertion fingers, on the lower beamlike carrying component 1b. The upper bearing component 1a then has the shape of an annular disk with a V-shaped cutout.

Figure 3:
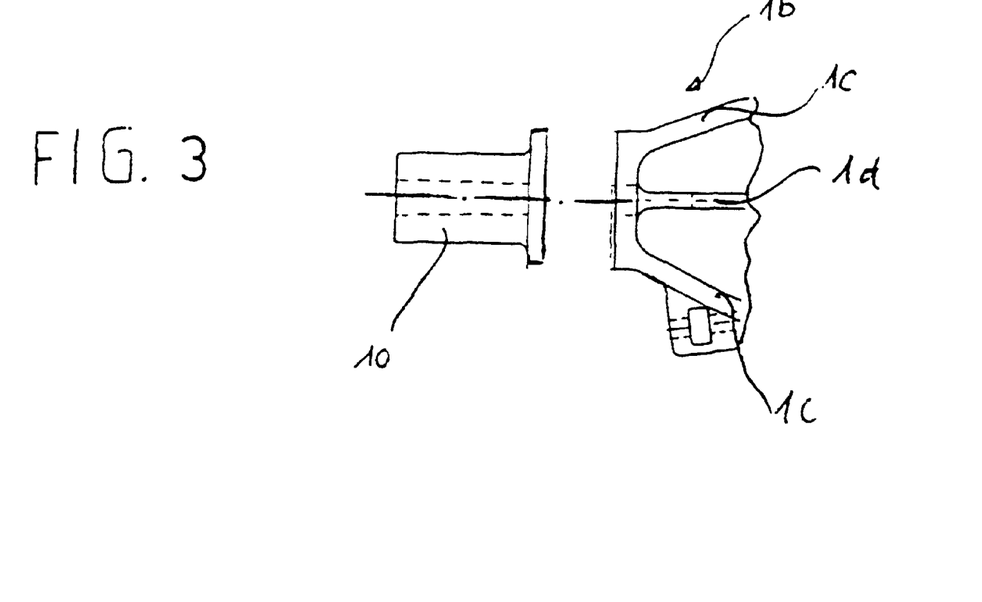

The horns 2a are preferably designed as separate components, similar to the journals 10 in FIG. 3, in order to foster a modular design, and are detachably arranged or screwed onto the corresponding component. When they are worn down, only they need to be replaced, and not the entire corresponding piece.

Figure 5:
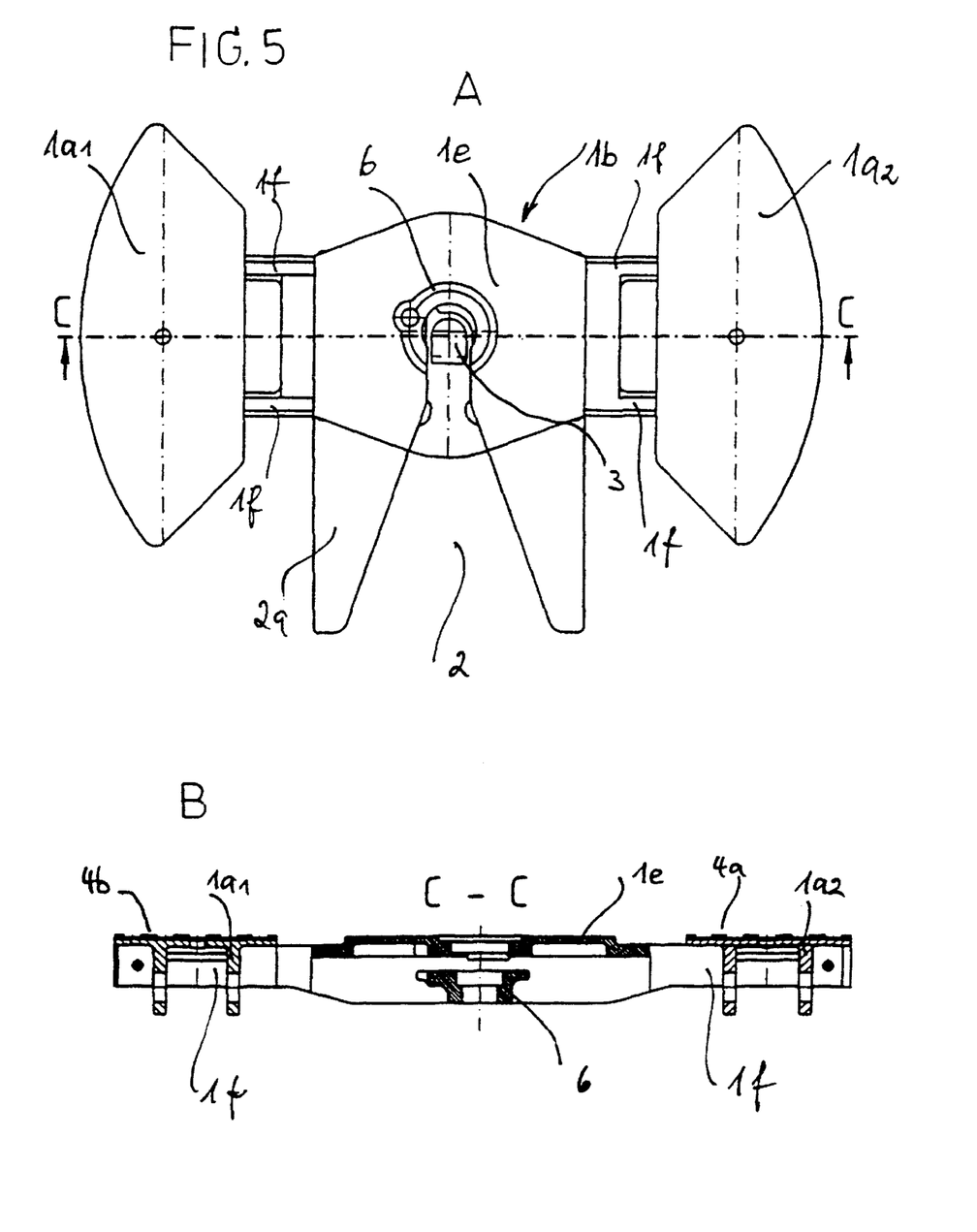
Figure 6:
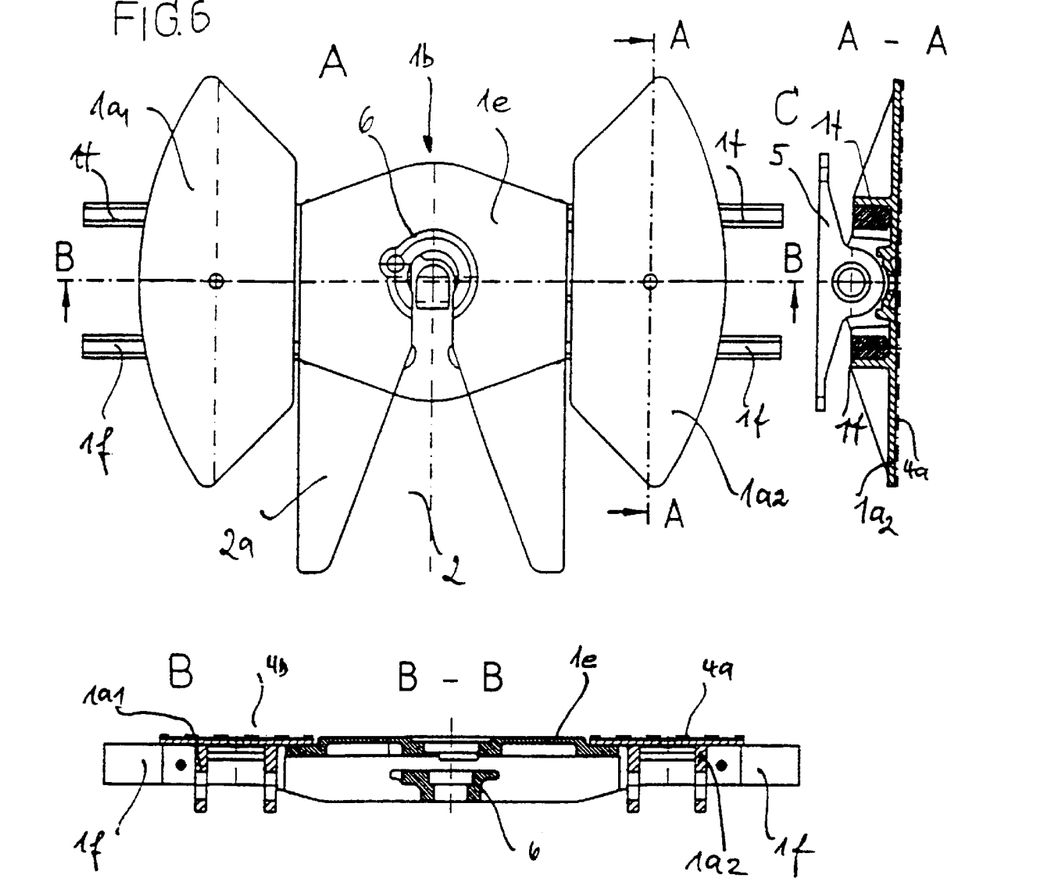

FIGS. 5 and 6 show an embodiment of the invented fifth wheel coupling in which, as already mentioned, a middle piece 1e is fashioned on the beamlike carrying component 1b with the horns 2a and the coupling mouth 2. This middle piece 1e can be molded as a single piece (as shown) or interchangeably secured as a separate piece in accordance with a modular design.

In the embodiment per FIGS. 5 and 6, the upper bearing component is two-part, and the two parts, designated as wing plates 1 a1 and 1 a2, are arranged at either side of the middle piece. These two wing plates are preferably mirror images of each other. They are somewhat higher than the middle piece 1e, preferably by around 3 mm, i.e., similar to the bearing component of FIG. 1 they absorb the surface load of the semitrailer and provide for low friction when traveling on curves, thanks to the sliding lining 4a, 4b deposited on them.

The carrying component 1b, unlike FIG. 2, does not have three beam pieces 1c and 1d, which emerge into a journal 10, but rather two beam pieces 1f, on which the wing plates 1 1a, 1 a2 can move, so that they can be adjusted to the respective frame width of the double train.

Various structural solutions are conceivable for conducting the forces acting on the wing plates into the frame of the double train.

In the embodiment per FIGS. 5 and 6, each of the two wing plates is joined to a bearing block 5 (FIG. 6, Part C), which is in turn secured to the frame of the double train. Thus, in this embodiment, the wing plates 1 a1, 1 a2 themselves carry the bearing sites. Therefore, the wing plates conduct the surface load of the semitrailer directly into the bearing sites, i.e., into the frame of the double train, so that this load does not have to be taken up by the carrying component 1b.

Yet it is also possible to provide a journal 10 on the carrying component 1b, similar to the embodiment of FIG. 2, i.e., to arrange the bearing sites on the carrying component 1b, similar to FIG. 3, and to join the wing plates 1 a1, 1 a2, in some fashion with the carrying component 1b, especially by screwing them together. In such a configuration, the surface load of the semitrailer, taken up by the wing plates, is conducted via the carrying component 1b into the bearing sites, yet closer to the beam ends than in the design of FIGS. 1 and 2.

Figure 7:
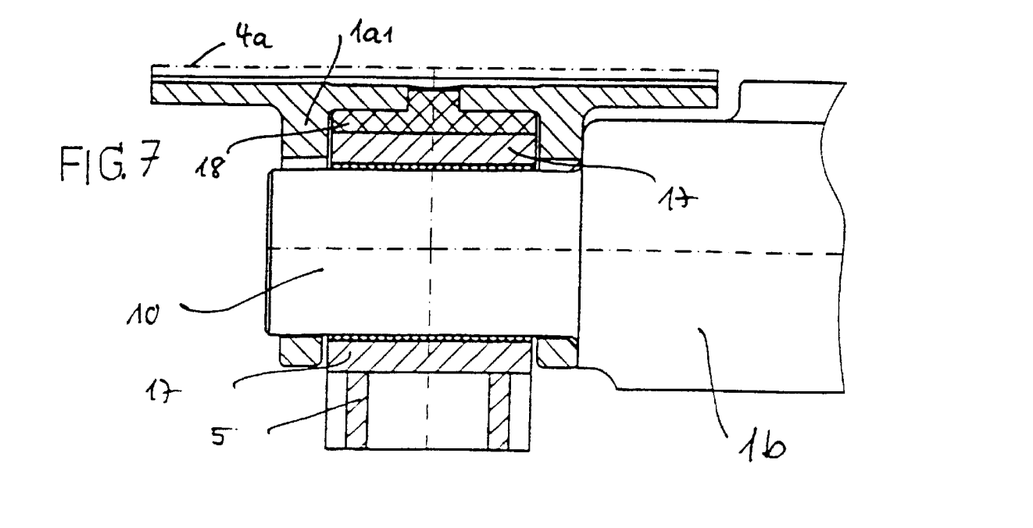

Yet there is also the option depicted in FIG. 7, where the carrying component 1b is provided on both sides with a journal 10, on which the respective wing plate 1 a1, 1 a2 is mounted. Here as well, the load is conducted directly into the frame.

The journal 10 is mounted in a bearing bush 17 of the bearing element 5, through the intermediation of an upper elastic insert 18, in order to provide a certain swivel capability of the wing plate 1 a1.

In the depicted and described sample embodiments, the fifth wheel coupling is secured unable to turn with respect to a vertical axis dictated by the kingpin axis. However, it is also possible to provide a corresponding rotatability about a vertical axis by the installation of roller bearings, e.g., between the two components, thereby significantly reducing the friction problem.

What is claimed is:

1. A fifth wheel coupling adapted for the articulated connection of a tractor with a semitrailer comprising: a coupling plate adapted to be secured on the tractor via bearing elements, which has a cutout with a central recess and is adapted to have a lock adapted for receiving and locking a kingpin adapted to be permanently mounted on the semitrailer in the middle of an upper plate, and which has a friction-reducing sliding layer, wherein the coupling plate includes two mechanically interconnectable, separate structural components, with an upper bearing component, which is adapted to interact with the upper plate, and with a lower carrying component, on which is arranged the central recess adapted to have the securing lock, and wherein the bearing component is fashioned as a single plate and the carrying component as a beam, and the bearing component has a central opening, next to the sliding layer, concentric to the recess for a friction-free passage of the kingpin.

2. A fifth wheel coupling according to claim 1, wherein the bearing component is screwed together with the carrying component.

3. A fifth wheel coupling according to claim 1, wherein there is provided, on the lower carrying component, a circular molding with several fastening holes, and on the upper bearing component a congruent crown of fastening holes to receive fastening screws.

4. A fifth wheel coupling according to claim 1, wherein the cutout is V-shaped and bounded on both sides by a horn as an aid to guiding the kingpin, wherein the upper bearing component has the shape of a circular ring with a V-cutout congruent to the cutout and the horns are arranged on the lower carrying component.

5. A fifth wheel coupling according to claim 1, wherein the upper bearing component is plastic.

6. A fifth wheel coupling according to claim 5, wherein the plastic is a fiberglass-reinforced plastic, a plastic comprising a reinforcement in the form of embedded pieces, or a fiberglass-reinforced plastic having a reinforcement in the form of imbedded pieces.

7. A fifth wheel coupling according to claim 5, wherein the plastic comprises multiple layers.

8. A fifth wheel coupling according to claim 1, wherein the bearing component is made from metal.

9. A fifth wheel coupling according to claim 8, wherein the upper bearing component has connection elements which are connected to the sliding lining.

10. A fifth wheel coupling according to claim 9, wherein the connection elements are form-fittingly connected to the sliding linings which form a sliding layer.

11. A fifth wheel coupling according to claim 8, wherein the bearing component is made from metal comprising steel, aluminum, or cast iron.

12. A fifth wheel coupling according to claim 1, wherein the lower carrying component consists of three beams, one main middle beam and auxiliary side beams, each one parallel to the main middle beam, being brought together at two ends to form a base for the bearing element on a double train adapted to be at a coupling side.

13. A fifth wheel coupling according to claim 12, wherein the bearing element is molded as a single piece on the base.

14. A fifth wheel coupling according to claim 12, wherein the bearing element is a separate component, which can be detachably connected to the base.

15. A fifth wheel coupling according to claim 12, wherein the bearing element is a journal and a corresponding split bearing is formed directly in a frame of the double train, and a clamping component for securing the journal, grasping the journal at the top, is provided and fastened to the frame.

16. A fifth wheel coupling according to claim 1, wherein the bearing component consists of two separate plate parts (wing plates), which are arranged on both sides of a middle piece fashioned as a plate in the middle of the carrying component, which has the cutout with the bordering horns, arranged preferably detachable.

17. A fifth wheel coupling according to claim 16, wherein the two wing plates are fastened on the beam carrying component, and the carrying component are received in the bearing elements double train.

18. A fifth wheel coupling according to claim 16, wherein the carrying component has two carrying beams, on which the two wing plates are supported and able to move, and which are each received in one of the bearing elements on the double train.

19. A fifth wheel coupling according to claim 16, wherein the beam carrying component has a journal at both beam ends, which is received in one of the bearing elements on the double train and which is supported on the respective wing plate.

20. A fifth wheel coupling according to claim 1, wherein the cutout is V-shaped and bounded on both sides by a horn as an aid to guiding the kingpin, wherein the horns with the V-shaped cutout are provided on the upper bearing component.

21. A fifth wheel coupling according to claim 20, wherein each horn is a separate component, which is detachably connected to the upper bearing component.

22. A fifth wheel coupling according to claim 21 wherein the horn is detachably screwed to the upper bearing component.

23. A fifth wheel coupling according to claim 20, wherein each horn is a separate component, which is detachably connected to the lower carrying component.

24. A fifth wheel coupling according to claim 23, wherein the horn is detachably screwed to the lower carrying component.

* * * * *